United States Patent [19]

Lim

[11] Patent Number: 4,820,429

[45] Date of Patent: Apr. 11, 1989

[54] SURFACTANT COMPOSITIONS FOR STEAMFLOODS

[75] Inventor: Timothy Lim, Auburn, Mich.

[73] Assignee: The Dow Chemical Company, Midland, Mich.

[21] Appl. No.: 58,626

[22] Filed: Jun. 2, 1987

Related U.S. Application Data

[63] Continuation of Ser. No. 851,301, Apr. 7, 1986, abandoned, which is a continuation of Ser. No. 608,286, May 8, 1984, abandoned.

[51] Int. Cl.$^4$ ............................................. E21B 43/24
[52] U.S. Cl. .................................. 252/8.554; 166/272; 166/303
[58] Field of Search ..................... 252/8.554; 166/272, 166/275, 303

[56] References Cited

U.S. PATENT DOCUMENTS

| | | |
|---|---|---|
| 3,945,437 | 3/1976 | Chiu et al. .................. 252/8.554 X |
| 3,990,515 | 11/1976 | Wilchester et al. ................. 166/273 |
| 4,393,937 | 7/1983 | Dilgren et al. .............. 252/8.554 X |
| 4,493,370 | 1/1985 | Stapp et al. .................. 252/8.554 X |
| 4,493,371 | 1/1985 | Reisberg et al. ................. 166/275 X |

Primary Examiner—Herbert B. Guynn

[57] ABSTRACT

The present invention is an improved surfactant composition useful for providing improved production of oil, or displacing oil within the pores of an oil-containing reservoir under steamflood conditions comprises a synergistic mixture of an α-olefin sulfonate and an alkylated diphenyl oxide sulfonate component.

7 Claims, No Drawings

SURFACTANT COMPOSITIONS FOR STEAMFLOODS

CROSS-REFERENCE TO RELATED APPLICATION

This is a continuation of application Ser. No. 851,301 filed Apr. 7, 1986, which is a continuation of application Ser. No. 608,286, filed May 8, 1984, both now abandoned.

BACKGROUND OF THE INVENTION

The present invention relates to the displacing of oil within a permeable material such as a subterranean reservoir.

Aqueous anionic surfactant systems are known to be particularly efficient for displacing oil. Such an anionic surfactant system is a substantially homogeneous aqueous liquid composition that may comprise a solution, a microemulsion, or a micellar dispersion of anionic surfactant molecules and/or micelles. The water-solubilities and oil-solubilities of the surfactants in such a system are such that those materials tend to remain along an oil/water interface, rather than being completely dissolved or dispersed within either the water-phase or oil-phase of the system. The anionic surfactants comprise surface active salts or soaps of organic acids.

In a process for displacing oil, the surfactants in an aqueous anionic surfactant system can be pre-formed or formed within permeable material such as a subterranean reservoir. U.S. Pat. No. 3,174,542 describes oil displacing processes in which acidic materials are injected ahead of basic materials so that surfactant systems are formed in situ. Pre-formed active aqueous petroleum sulfonate surfactant systems containing activity-enhancing concentrations of electrolytes are described in U.S. Pat. Nos. 3,330,344 and 3,348,611. Active aqueous anionic surfactant systems containing electrolytes, water thickening material, and chemicals selected for their ability to favorably modify emulsions formed between the oil and the oil-displacing surfactant system are described in U.S. Pat. Nos. 3,712,377 and 3,768,560.

Although aqueous anionic surfactant systems are generally efficient oil-displacing fluids, they have relatively low tolerances to multivalent cations. Such cations are commonly encountered in waters or brines in subterranean reservoirs that contain solutions of calcium or magnesium salts, or the like. The multivalent cations tend to react with the anionic surfactants or the components of anionic surfactants or the components of anionic surfactant systems to form precipitates, to cause phase separations, or the like.

Multivalent cation tolerance problems typical of aqueous anionic surfactant systems are discussed in patents such as U.S. Pat. No. 3,508,612; U.S. Pat. No. 3,675,716; etc. Those patents suggested improving the multivalent cation tolerance by dissolving co-surfactant such as alkoxy-alcohol sulfates in the systems. U.S. Pat. No. 3,799,264 suggests using surfactant systems that contain sulfated aliphatic anionic surfactants, nonionic surfactants, and a water-soluble guanidine salt, in order to provide an improved tolerance to multivalent cations.

It is taught that improved aqueous anionic surfactant systems can be employed in displacing oil within remotely located permeable subterranean reservoirs in U.S. Pat. Nos. 3,945,437; 4,013,569 and 4,393,937. For example, it is taught in U.S. Pat. No. 4,393,937 that a steam foam drive process can be employed in displacing oil within a subterranean reservoir.

In view of the fact that high foaming, thermally stable, brine and divalent ion tolerant surfactants are desirable for use in displacing oil from subterranean reservoirs, it would be highly desirable to provide such surfactants.

SUMMARY OF THE INVENTION

The present invention is a composition useful for displacing oil within the pores of or for producing oil from an oil-containing reservoir, comprising (a) an aqueous liquid, present in the composition, at a temperature substantially equalling its boiling temperature at the reservoir pressure, in both a liquid phase and a vapor phase of steam, and (b) a functionally effective amount of a surfactant composition comprising a synergistic mixture of an $\alpha$-olefin sulfonate component and an alkylated diphenyl oxide sulfonate component, and optionally (c) a noncondensable gas. That is, the present invention is an improved surfactant composition useful for providing improved production of oil, or displacing oil within the pores of an oil-containing reservoir under steamflood conditions, said composition comprising a synergistic mixture of an $\alpha$-olefin sulfonate and an alkylated diphenyl oxide sulfonate component.

The composition of this invention is useful in a process for producing oil from or displacing oil within the pores of a subterranean reservoir. Of particular interest is a process for moving oil or an emulsion of oil and water through a reservoir and thus away from a well borehole, and for displacing oil into a producing location in an oil-recovery operation.

DETAILED DESCRIPTION OF THE INVENTION

Exemplary alkylated diphenyl oxide sulfonates are disclosed in U.S. Pat. Nos. 3,264,242; 3,634,272; and 3,945,437, which are incorporated herein by reference. See also, McCutcheon's *Detergents and Emulsifiers*, North American Edition, 1983 Annual. Preferred alkylated diphenyl oxide sulfonates are those alkali metal, ammonium or amine salts of an alkylated diphenyl oxide sulfonic acid. Also useful are the acid form of the alkylated diphenyl oxide sulfonic acid, as well as the water-soluble divalent salts thereof of such metal ions as calcium or magnesium. Combinations of acid forms as well as various counterions can be employed. Preferably, the alkyl portions of the alkylated diphenyl oxide sulfonates can vary, and can each contain about 6 or more carbon atoms; most preferably from about 6 to about 24 carbon atoms. Most desirably, there are about 1 or 2 alkyl groups per alkylated diphenyl oxide sulfonate. There can be mixtures of mono- or di- alkylated diphenyl oxide sulfonates.

Exemplary $\alpha$-olefin sulfonates are disclosed in U.S. Pat. No. 4,393,937, which is incorporated herein by reference. Exemplary $\alpha$-olefin sulfonates are disclosed in McCutcheon's *Detergents and Emulsifiers*, North American Edition, 1983 Annual.

Compositions of this invention require a synergistic mixture of an $\alpha$-olefin sulfonate component and an alkylated diphenyl oxide sulfonate component. That is, amounts of each of the two critical components can vary relative to one another. Adequately improved surfactant compositions comprise, for example, essentially equal amounts by weight of active α-olefin sulfonate and alkylated diphenyl oxide sulfonate components.

The compositions of this invention are preferably formulated with a liquid carrier such as an aqueous liquid using techniques as taught in U.S. Pat. Nos. 3,945,437 and 4,393,937. Other surfactants, foaming agents, antioxidants, and the like can be incorporated into the formulation.

The amount of synergistic surfactant composition which is employed relative to the liquid carrier can vary. Preferably, the surfactant is present in the liquid carrier in an amount of about 0.01 to about 5, preferably from about 0.1 to about 2, weight percent based on the weight of the surfactant plus liquid.

The surfactants are employed in steamflood drive processes using techniques known in the art. See, for example, those processes taught in U.S. Pat. No. 4,393,937. Preferred steamflood processes are performed in a range from about 300° F. to about 500° F.

The compositions of this invention are capable of providing large amounts of foam. In addition, compositions of this invention are thermally stable under most conditions of use and are highly brine tolerant. In particular, compositions of this invention can be tolerant of calcium ions under conditions which the α-olefin sulfonate components are not effective, when employed alone. Compositions of this invention provide low interfacial tensions between the steam front which is provided and the oil front as well as undergoing a low amount of adsorption onto permeable rock formations, etc.

The following example is presented to further illustrate but not limit the scope of this invention. All parts and percentages are by weight, unless otherwise noted.

EXAMPLE 1

A surfactant composition is prepared by blending equal active percentages of component A which is a surfactant composition comprising 80 percent monoalkylated diphenyl oxide, disodium sulfonate, and 20 percent dialkylated diphenyl oxide, disodium sulfonate, wherein the alkyl portion is about $C_{12}$; (sold commercially as Dowfax® 2A1 by The Dow Chemical Company) and component B which is a surfactant composition comprising an α-olefin sulfonate; (sold commercially as Witconate® AOS by the Witco Chemical Corporation) in enough water such that a 1 percent active surfactant composition is obtained. Into a Waring Blendor is transferred 100 ml of the surfactant composition and said solution is sheared at a high rate for 25 seconds. This is designated as Sample 1. The foam is transferred to a 1,000 ml graduated cylinder. The foam volume is observed 100 seconds after the solution is sheared. Foam volumes of the surfactant composition of this invention is compared with foam volumes of a sample containing individually 1 percent active component A (Sample A) and a sample containing individually 1 percent active component B (Sample B). Results are presented in Table I.

TABLE I

| Sample | Foam Volume (ml) |
|---|---|
| 1 | 715 |
| A* | 600 |

TABLE I-continued

| Sample | Foam Volume (ml) |
|---|---|
| B* | 610 |

*Not an example of this invention.

The data in Table I illustrates the synergistic foam effect provided by the mixture of components, thus providing an example of this invention.

EXAMPLE 2

The permeability of porous media to steamflow is determined using experimental procedures as described by Dilgren in Society of Petroleum Engineers of AIME, SPE 10774 (1982). Each aqueous sample contains 0.5 percent active surfactant, and 2 percent sodium chloride is tested at 400° F. and a pressure of 250 psi. The sample has a steam quality of 50 percent and 0.5 percent non-condensible gas. Three samples are prepared and represent the alkylated diphenyl oxide disodium sulfonate; the α-olefin sulfonate; and a synergistic mixture thereof, as described in Example 1. Results indicate that the synergistic mixture has a synergistic permeability reduction effect over the comparative samples. The residual oil saturation after steamflood of the synergistic sample is 21 percent; whereas the oil saturation of the comparative samples is 33 percent and 38 percent, respectively.

What is claimed is:

1. A composition useful for displacing oil within the pores of or for producing oil from an oil-containing reservoir, comprising (a) an aqueous liquid, present in the composition, at a temperature substantially equalling its boiling temperature at the reservoir pressure, in both a liquid phase and vapor phase of steam, and (b) a functionally effective amount of a surfactant mixture consisting essentially of an α-olefin sulfonate surfactant and mono- or di-alkylated diphenyl oxide sulfonate surfactant wherein the alkyl portion of the alkylated diphenyl oxide sulfonate contains from about 6 to about 24 carbon atoms.

2. The composition of claim 1 wherein the composition further comprises a noncondensable gas.

3. A steam flooding process for displacing oil from a subterranean formation comprising the step of injecting a liquid comprising a surfactant mixture capable of providing a foam consisting essentially of an α-olefin sulfonate surfactant and a mono- or di-alkylated diphenyl oxide sulfonate surfactant wherein the alkyl portion of the alkylated diphenyl oxide sulfonate contains from about 6 to about 24 carbon atoms into a subterranean reservoir at steam flooding conditions in order to displace oil therein.

4. The steam flooding process of claim 3 wherein the surfactant mixture comprises about 0.01 to about 5 weight percent of the composition.

5. The steam flooding process of claim 3 wherein the alkylated diphenyl oxide sulfonate is an alkali metal, ammonium or amine salt of an alkylated diphenyl oxide sulfonic acid or a water-soluble divalent salt of an alkylated diphenyl oxide sulfonic acid.

6. A steam flooding process for displacing oil from a subterranean formation comprising the step of injecting a liquid comprising the composition of claim 1 into a subterranean reservoir at steam flooding conditions in order to displace oil therein.

7. The steam flooding process of claim 6 wherein the composition further comprises a noncondensable gas.

* * * * *